(12) United States Patent
Sanchez

(10) Patent No.: US 6,325,443 B1
(45) Date of Patent: Dec. 4, 2001

(54) VISOR EXTENSION DEVICE

(76) Inventor: Marilu Sanchez, 1320 Hibiscus St., Oxnard, CA (US) 93030

( * ) Notice: Subject to any disclaimer, the term of this patent is extended or adjusted under 35 U.S.C. 154(b) by 0 days.

(21) Appl. No.: 09/770,271

(22) Filed: Jan. 26, 2001

(51) Int. Cl.$^7$ .................................................. B60J 3/02
(52) U.S. Cl. ...................................... 296/97.6; 296/97.8
(58) Field of Search .................... 296/97.6, 97.8

(56) References Cited

U.S. PATENT DOCUMENTS

| D. 361,970 | 9/1995 | Zetterlund . | |
|---|---|---|---|
| 1,958,934 | 5/1934 | Williams . | |
| 2,422,863 | * 6/1947 | Stroth | ................... 296/97.8 |
| 2,542,409 | 2/1951 | Guenther . | |
| 2,596,873 | * 5/1952 | Solmes | ................... 296/97.8 |
| 2,733,763 | * 2/1956 | Nygaard | ............. 296/97.8 X |
| 4,792,176 | * 12/1988 | Karford | ............. 296/97.6 X |
| 4,978,160 | * 12/1990 | Welschoff | ................... 296/97.8 |
| 4,982,992 | 1/1991 | Vu et al. . | |
| 5,213,389 | 5/1993 | Loftis et al. . | |
| 5,283,683 | * 2/1994 | Yamamoto | ............. 296/97.8 X |
| 5,513,892 | * 5/1996 | Thomas | ............. 296/97.8 X |
| 5,673,957 | 10/1997 | Moo et al. . | |
| 5,873,621 | * 2/1999 | Kuighadush et al. | ............. 296/97.8 |

* cited by examiner

Primary Examiner—Joseph D. Pape

(57) ABSTRACT

A visor extension device for increasing a covering area of a vehicle sun visor. The visor extension device includes a plate having a front side, back side, bottom edge, top edge, first side edge and second side edge. A first wall is integrally coupled to the first side edge and extends away from the front side. A second wall is integrally coupled to the second side edge and extends away from the front side. A flange is integrally coupled to a top edge of the first and second walls and extends toward a central portion of the plate. A panel has a length generally equal to a distance between the first and second walls. The panel has a pair of lateral side walls each abutting one of the first and second side walls. The panel frictionally engages the first and second walls. At least one clip member for engaging a visor is securely attached to the back surface of the plate.

7 Claims, 3 Drawing Sheets

VISOR EXTENSION DEVICE

BACKGROUND OF THE INVENTION

1. Field of the Invention

The present invention relates to visor extension devices and more particularly pertains to a new visor extension device for increasing a covering area of a vehicle sun visor.

2. Description of the Prior Art

The use of visor extension devices is known in the prior art. More specifically, visor extension devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Des. Pat. No. 361,970; U.S. Pat. No. 5,673,957; U.S. Pat. No. 1,958,934; U.S. Pat. No. 2,542,409; U.S. Pat. No. 4,982,992; and U.S. Pat. No. 5,213,389.

While these devices fulfill their respective, particular objectives and requirements, the aforementioned patents do not disclose a new visor extension device. The inventive device includes a plate having a front side, back side, bottom edge, top edge, first side edge and second side edge. A first wall is integrally coupled to the first side edge and extends away from the front side. A second wall is integrally coupled to the second side edge and extends away from the front side. A flange is integrally coupled to a top edge of the first and second walls and extends toward a central portion of the plate. A panel has a length generally equal to a distance between the first and second walls. The panel has a pair of lateral side walls each abutting one of the first and second side walls. The panel frictionally engages the first and second walls. At least one clip member for engaging a visor is securely attached to the back surface of the plate.

In these respects, the visor extension device according to the present invention substantially departs from the conventional concepts and designs of the prior art, and in so doing provides an apparatus primarily developed for the purpose of increasing a covering area of a vehicle sun visor.

SUMMARY OF THE INVENTION

In view of the foregoing disadvantages inherent in the known types of visor extension devices now present in the prior art, the present invention provides a new visor extension device construction wherein the same can be utilized for increasing a covering area of a vehicle sun visor.

The general purpose of the present invention, which will be described subsequently in greater detail, is to provide a new visor extension device apparatus and method which has many of the advantages of the visor extension devices mentioned heretofore and many novel features that result in a new visor extension device which is not anticipated, rendered obvious, suggested, or even implied by any of the prior art visor extension devices, either alone or in any combination thereof.

To attain this, the present invention generally comprises a plate having a front side, back side, bottom edge, top edge, first side edge and second side edge. A first wall is integrally coupled to the first side edge and extends away from the front side. A second wall is integrally coupled to the second side edge and extends away from the front side. A flange is integrally coupled to a top edge of the first and second walls and extends toward a central portion of the plate. A panel has a length generally equal to a distance between the first and second walls. The panel has a pair of lateral side walls each abutting one of the first and second side walls. The panel frictionally engages the first and second walls. At least one clip member for engaging a visor is securely attached to the back surface of the plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new visor extension device apparatus and method which has many of the advantages of the visor extension devices mentioned heretofore and many novel features that result in a new visor extension device which is not anticipated, rendered obvious, suggested, or even implied by any of the prior art visor extension devices, either alone or in any combination thereof.

It is another object of the present invention to provide a new visor extension device which may be easily and efficiently manufactured and marketed.

It is a further object of the present invention to provide a new visor extension device which is of a durable and reliable construction.

An even further object of the present invention is to provide a new visor extension device which is susceptible of a low cost of manufacture with regard to both materials and labor, and which accordingly is then susceptible of low prices of sale to the consuming public, thereby making such visor extension device economically available to the buying public.

Still yet another object of the present invention is to provide a new visor extension device which provides in the apparatuses and methods of the prior art some of the advantages thereof, while simultaneously overcoming some of the disadvantages normally associated therewith.

Still another object of the present invention is to provide a new visor extension device for increasing a covering area of a vehicle sun visor.

Yet another object of the present invention is to provide a new visor extension device which includes a plate having a front side, back side, bottom edge, top edge, first side edge and second side edge. A first wall is integrally coupled to the first side edge and extends away from the front side. A second wall is integrally coupled to the second side edge and extends away from the front side. A flange is integrally coupled to a top edge of the first and second walls and extends toward a central portion of the plate. A panel has a length generally equal to a distance between the first and second walls. The panel has a pair of lateral side walls each abutting one of the first and second side walls. The panel frictionally engages the first and second walls. At least one clip member for engaging a visor is securely attached to the back surface of the plate.

Still yet another object of the present invention is to provide a new visor extension device that is retrofittable to existing visors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
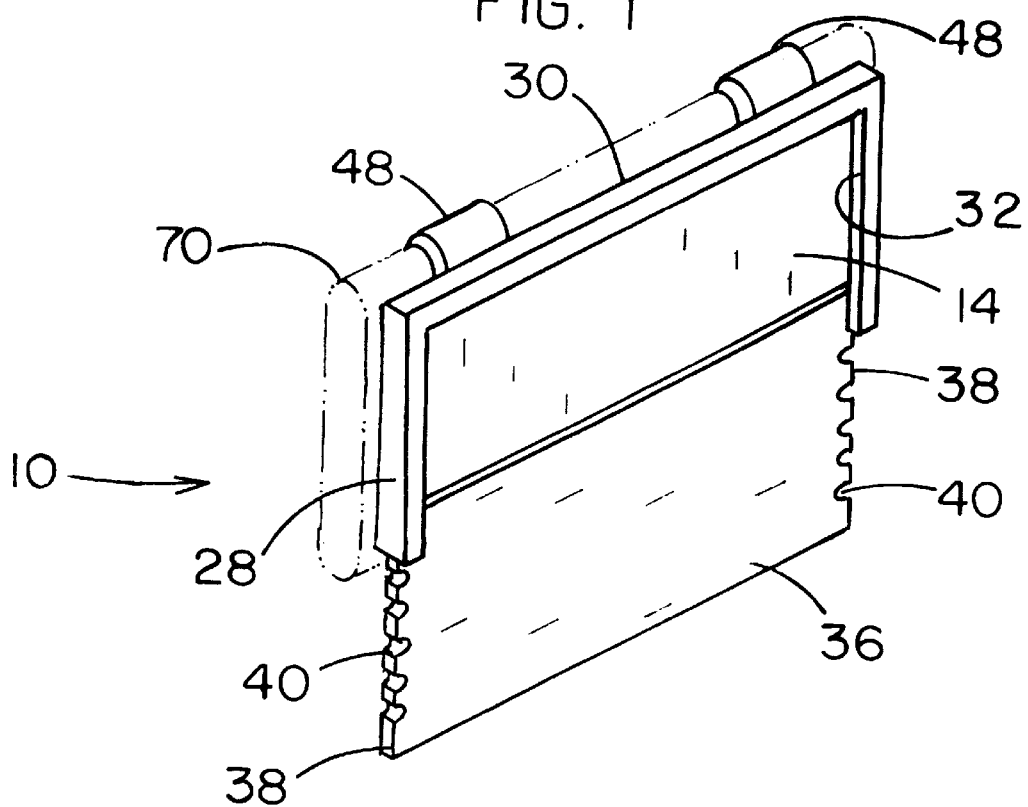
FIG. 1 is a schematic perspective view of a new visor extension device according to the present invention.
Figure 2:
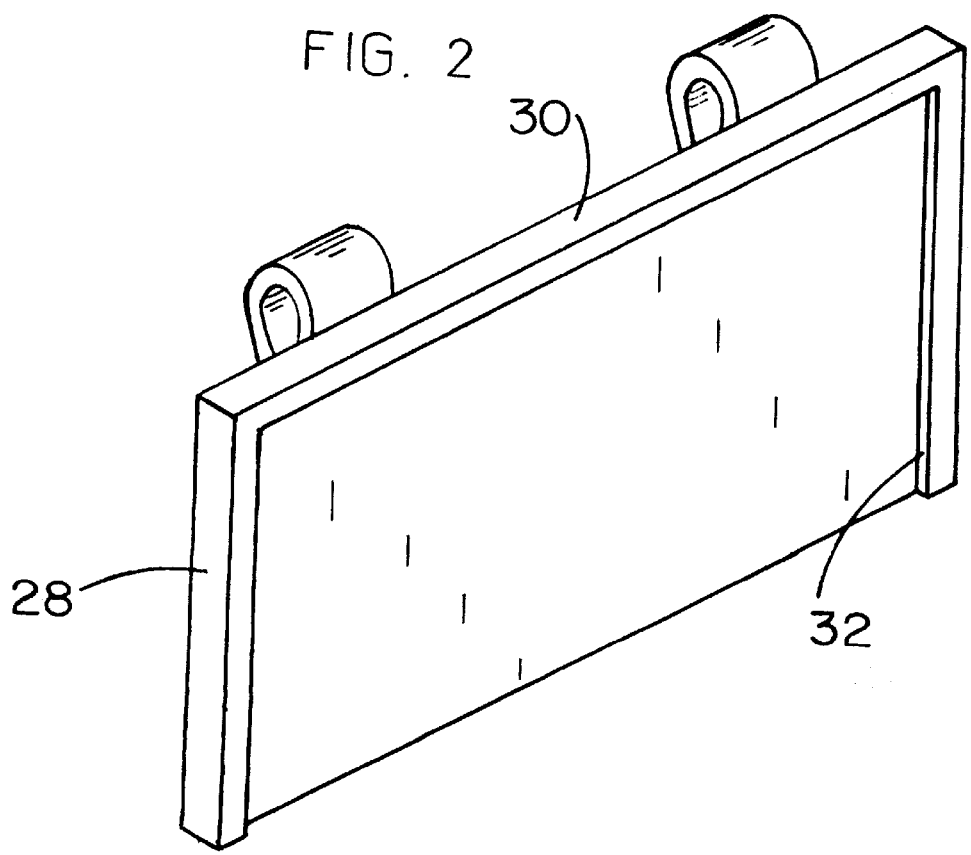
FIG. 2 is a schematic perspective view of the present invention.
Figure 3:
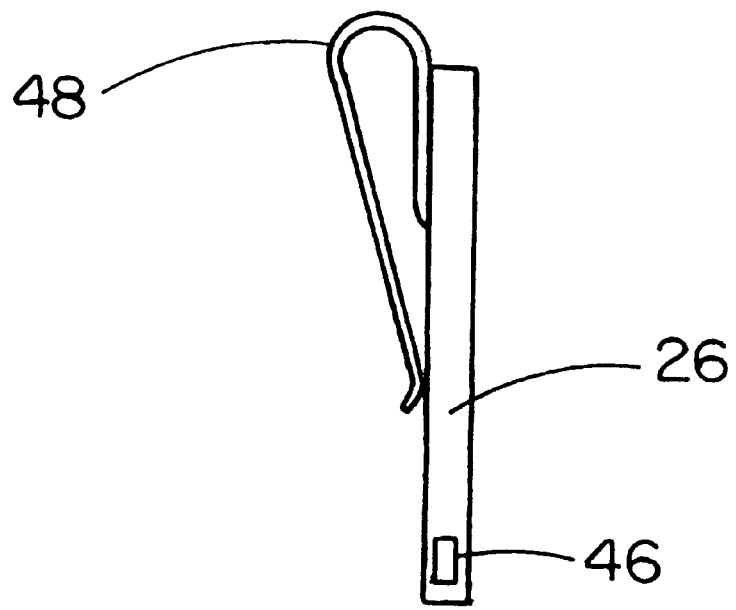
FIG. 3 is a schematic side view of the present invention.
Figure 5:
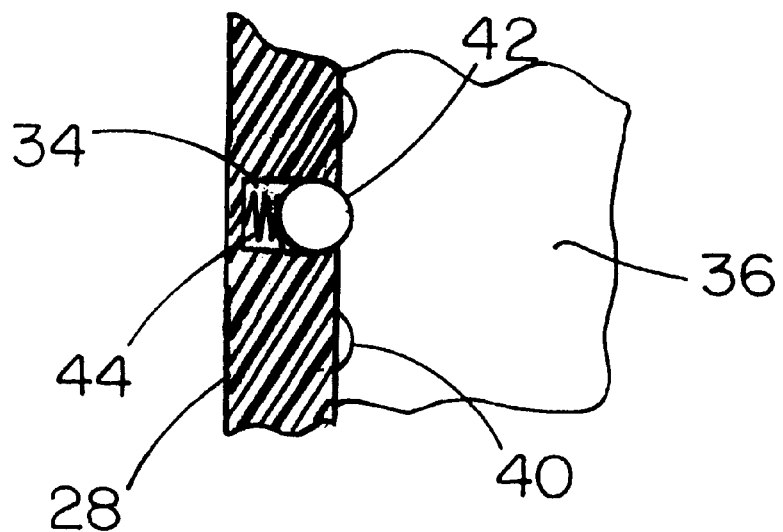
FIG. 5 is a schematic cross-sectional view of the present invention.
Figure 4:
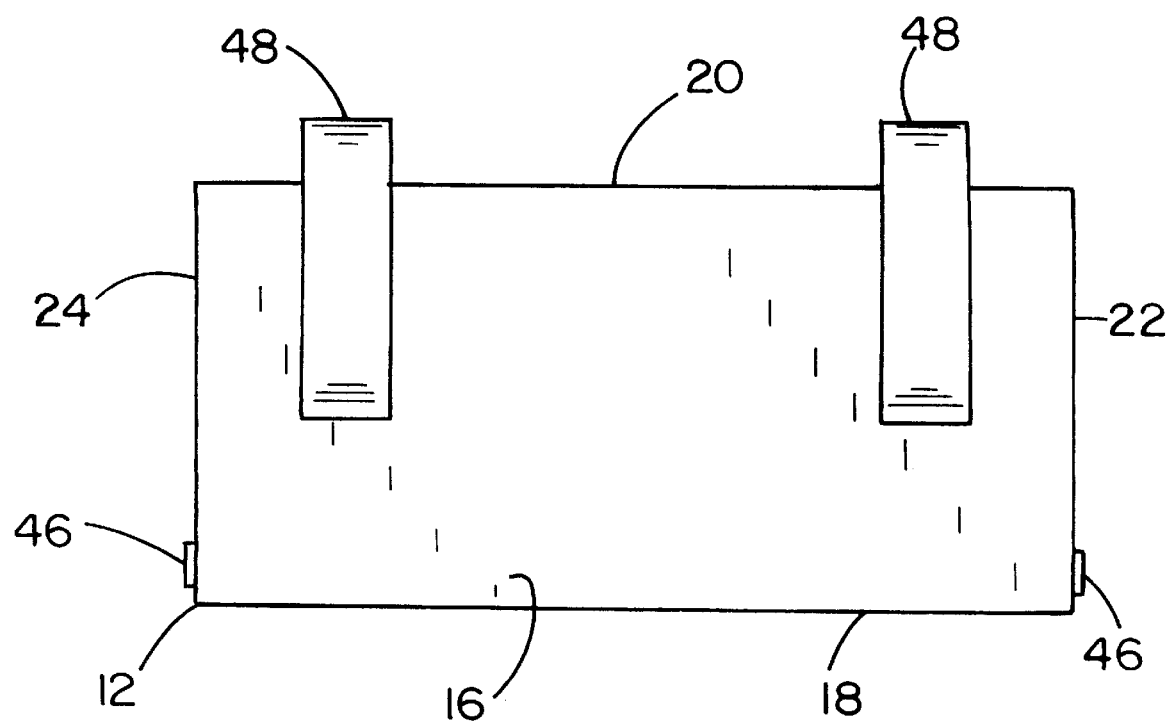
FIG. 4 is a schematic back view of the present invention.

With reference now to the drawings, and in particular to FIGS. 1 through 5 thereof, a new visor extension device embodying the principles and concepts of the present invention and generally designated by the reference numeral 10 will be described.

As best illustrated in FIGS. 1 through 5, the visor extension device 10 generally comprises device for positioning on a vehicular sun visor 70. The device 10 includes a plate 12 having a front side 14, back side 16, bottom edge 18, top edge 20, first side edge 22 and second side edge 24. A first wall 26 is integrally coupled to the first side edge 22 and extends away from the front side 14. A second wall 28 is integrally coupled to the second side edge 24 and extends away from the front side 14. A third wall 30 is integrally coupled to the top edge 20 and extends away from the front side 24. A flange 32 is integrally coupled to a top edge of the first 26, second 28 and third 30 walls and extends toward a central portion of the plate 12. Each of the first 26 and second 28 walls has a depression 34 therein. The depressions 34 are generally oppositely disposed with respect to each other and each is positioned generally adjacent to the bottom edge 18 of the plate.

A panel 36 has a length generally equal to a distance between the first 26 and second 28 walls. The panel 36 has a pair of lateral side walls 38. Each of the lateral side walls 38 abuts one of the first 26 and second 28 side walls. Each of the lateral side walls 38 has a plurality indentations 40 therein. The panel 36 is movably positionable between and abuts the first 26 and second 28 walls.

A pair of fasteners is provided for releasably engaging the indentations 40. Each of the fasteners is positioned in one of the depressions 34. Each of the fasteners includes a spherical member 42 positioned in a respective depression 34 and a biasing means 44 for biasing the spherical member 42 out of the depression 34. Each of the biasing means 44 comprises a spring. Each of the spherical members 42 frictionally engages one of the indentations 40 in the lateral side walls 38. Alternatively, protruding members 46 may be extended through first 26 and second 28 side walls and movably extended into the indentations 40 to hold the panel 36 in a secured relationship with the plate 12.

A pair of clip members 48 engages the visor 70. Each of the clip members 48 is securely attached to the back surface 16 of the plate and spaced from each other. Each of the clip members 48 is positioned generally adjacent to the top edge 20.

In use, the device 10 is removably attached to a visor 70 using the clip members 48. When a user wants to shield additional light coming form under a lowered visor, the panel 38 may be extended downward to block light.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A visor extension device for positioning on a vehicular sun visor, said device comprising:

a plate having a front side, back side, bottom edge, top edge, first side edge and second side edge, a first wall being integrally coupled to said first side edge and extending away from said front side, a second wall being integrally coupled to said second side edge and extending away from said front side, a flange being integrally coupled to a top edge of said first and second walls and extending toward a central portion of said plate;

a panel having a length generally equal to a distance between said first and second walls, said panel having a pair of lateral side walls, each of said lateral side walls abutting one of said first and second side walls, said panel frictionally engaging said first and second walls; and at least one clip member for engaging said visor, said clip member being securely attached to said back surface of said plate;

each of said first and second walls having a depression therein, said depressions being generally oppositely disposed with respect to each other and each being positioned generally adjacent to said bottom edge of said plate;

each of said lateral side walls of said panel having a plurality indentations therein; and a pair of fasteners for releasably engaging said indentations, each of said fasteners being positioned in one of said depressions.

2. The visor extension device as in claim 1, wherein each of said fasteners includes:

a spherical member positioned in a respective depression and a biasing means for biasing said spherical member out of said depression, each of said biasing means comprising a spring, each of said spherical members frictionally engaging one of said indentations in said lateral side walls.

3. The visor extension device as in claim 1, wherein said at least one clip member comprises a pair of clip members for engaging said visor, each of said clip members being securely attached to said back surface of said plate and spaced from each other, each of said clip members being positioned generally adjacent to said top edge.

4. A visor extension device for positioning on a vehicular sun visor, said device comprising:

a plate having a front side, back side, bottom edge, top edge, first side edge and second side edge, a first wall being integrally coupled to said first side edge and extending away from said front side, a second wall being integrally coupled to said second side edge and extending away from said front side, a third wall being integrally coupled to said top edge and extending away from said front side, a flange being integrally coupled to a top edge of said first, second and third walls and extending toward a central portion of said plate, each of said first and second walls having a depression therein, said depressions being generally oppositely disposed with respect to each other and each being positioned generally adjacent to said bottom edge of said plate;

a panel having a length generally equal to a distance between said first and second walls, said panel having a pair of lateral side walls, each of said lateral side walls abutting one of said first and second side walls, each of said lateral side walls having a plurality of indentations therein, said panel being movably positionable between and abutting said first and second walls;

a pair of fasteners for releasably engaging said indentations, each of said fasteners being positioned in one of said depressions, each of said fasteners including a spherical member positioned in a respective depression and a biasing means for biasing said spherical member out of said depression, each of said biasing means comprising a spring, each of said spherical members frictionally engaging one of said indentations in said lateral side walls; and a pair of clip members for engaging said visor, each of said clip members being securely attached to said back surface of said plate and spaced from each other, each of said clip members being positioned generally adjacent to said top edge.

5. A visor extension device for positioning on a vehicular sun visor, said device comprising:

a plate having a front side, back side, bottom edge, top edge, first side edge and second side edge, a first wall being integrally coupled to said first side edge and extending away from said front side, a second wall being coupled to said second side edge and extending away from said front side, a flange being integrally coupled to a top edge of said first and second walls and extending toward a central portion of said plate;

a panel slidably movable between said first and second walls, said panel having a pair of lateral sides, each of said lateral sides being positioned adjacent to one of said first and second side walls of said plate; and at least one clip member mounted on said plate for engaging the visor;

each of said first and second walls having a depression therein, said depressions being generally oppositely disposed with respect to each other;

each of said lateral sides of said panel having a plurality indentations therein; and a pair of fasteners for releasably engaging said indentations, each of said fasteners being positioned in one of said depressions.

6. The visor extension device as in claim 5, wherein each of said fasteners includes a spherical member positioned in a respective depression and a biasing means for biasing said spherical member in an outwardly direction from said depression for engaging one of said indentations in said panel.

7. The visor extension device as in claim 5, wherein said at least one clip member comprises a pair of clip members for engaging said visor.

* * * * *